US012353756B1

(12) United States Patent
Sutharsan et al.

(10) Patent No.: US 12,353,756 B1
(45) Date of Patent: Jul. 8, 2025

(54) SYSTEMS AND METHODS FOR JOINT DE-INTERLEAVING AND RATE RECOVERY IN A RECEIVER

(71) Applicant: Apple Inc., Cupertino, CA (US)

(72) Inventors: Thirunathan Sutharsan, San Diego, CA (US); Mohanned Sinnokrot, San Diego, CA (US); Wai Chan, San Diego, CA (US); Mihail Petrov, San Diego, CA (US)

(73) Assignee: Apple Inc., Cupertino, CA (US)

( * ) Notice: Subject to any disclaimer, the term of this patent is extended or adjusted under 35 U.S.C. 154(b) by 668 days.

(21) Appl. No.: 17/664,205

(22) Filed: May 19, 2022

Related U.S. Application Data

(60) Provisional application No. 63/261,649, filed on Sep. 24, 2021.

(51) Int. Cl.
  *G06F 3/06* (2006.01)
  *G06F 12/0802* (2016.01)

(52) U.S. Cl.
  CPC .......... *G06F 3/0656* (2013.01); *G06F 3/0611* (2013.01); *G06F 3/0679* (2013.01); *G06F 12/0802* (2013.01)

(58) Field of Classification Search
  CPC .... G06F 3/0656; G06F 3/0611; G06F 3/0679; G06F 12/0802
  See application file for complete search history.

(56) References Cited

U.S. PATENT DOCUMENTS

| | | | | |
|---|---|---|---|---|
| 10,103,843 | B1* | 10/2018 | Liu | ............ H04L 1/0071 |
| 2010/0077265 | A1* | 3/2010 | Wei | ............ H03M 13/296 |
| | | | | 714/701 |
| 2011/0145670 | A1* | 6/2011 | Fan | ............ H03M 13/2957 |
| | | | | 714/E11.131 |
| 2011/0280185 | A1* | 11/2011 | Wu | ............ H03M 13/6566 |
| | | | | 370/328 |

(Continued)

FOREIGN PATENT DOCUMENTS

WO 2017/131813 A1 8/2017

OTHER PUBLICATIONS

Jang, Min et al., "Rate Matching for Polar Codes Based on Binary Domination." arXiv:1901.02287v1 [cs.IT] Jan. 8, 2019. 14 pages.

(Continued)

*Primary Examiner* — Tracy C Chan
(74) *Attorney, Agent, or Firm* — Kilpatrick Townsend & Stockton LLP

(57) ABSTRACT

A processing system can perform joint de-interleaving and rate recovery on data elements from a received transmission. A load engine can write new data elements for a portion of a received code block into a de-interleaving buffer in a column-wise order. A de-rate-matching engine can read the new data elements in row-wise order from the de-interleaving buffer and combine the new data elements with stored data elements from a code-block buffer according to the position of the data elements in a code block, writing the updated data elements back to the code block buffer. The DRM engine can include a cache that stores recently updated data elements. When an address collision occurs between two update operations, the DRM engine can retrieve the recently updated data elements from the cache rather than waiting for the code block buffer.

20 Claims, 7 Drawing Sheets

(56) References Cited

U.S. PATENT DOCUMENTS

2011/0280186 A1* 11/2011 Rasquinha ........ H03M 13/6558
                                                    370/328
2017/0331670 A1* 11/2017 Parkvall ............... H04J 11/0056

OTHER PUBLICATIONS

Wu, Hao et al., "A High Throughput Implementation of QC-LDPC Codes for 5G NR." Digital Object Identifier, 10.1109/ACCESS.2019.2960839. Publication date Dec. 19, 2019 (revised Dec. 31, 2019). 12 pages.

* cited by examiner

| ROW | CODE BLOCK BIT POSITION | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | | | | | | | | | | | | | | | | |
| 1 | 1280 | 1281 | 1282 | 1283 | 1284 | 1285 | 1286 | 1287 | 1288 | 1289 | 1290 | 1291 | 1292 | 1293 | 1294 | 1295 |
| 2 | 0 | 1 | 2 | 3 | 4 | 5 | 6 | 7 | 8 | 9 | 10 | 11 | 12 | 13 | 14 | 15 |
| 3 | 1280 | 1281 | 1282 | 1283 | 1284 | 1285 | 1286 | 1287 | 1288 | 1289 | 1290 | 1291 | 1292 | 1293 | 1294 | 1295 |
| 4 | 0 | 1 | 2 | 3 | 4 | 5 | 6 | 7 | 8 | 9 | 10 | 11 | 12 | 13 | 14 | 15 |
| 5 | 1280 | 1281 | 1282 | 1283 | 1284 | 1285 | 1286 | 1287 | 1288 | 1289 | 1290 | 1291 | 1292 | 1293 | 1294 | 1295 |
| 6 | 0 | 1 | 2 | 3 | 4 | 5 | 6 | 7 | 8 | 9 | 10 | 11 | 12 | 13 | 14 | 15 |
| 7 | 1280 | 1281 | 1282 | 1283 | 1284 | 1285 | 1286 | 1287 | 1288 | 1289 | 1290 | 1291 | 1292 | 1293 | 1294 | 1295 |

*FIG. 5*

SYSTEMS AND METHODS FOR JOINT DE-INTERLEAVING AND RATE RECOVERY IN A RECEIVER

CROSS-REFERENCE TO RELATED APPLICATIONS

This application claims the benefit of U.S. Provisional Application No. 63/261,649, filed Sep. 24, 2021, the disclosure of which is incorporated herein by reference.

This disclosure also includes subject matter related to U.S. application Ser. No. 17/448,867, filed Sep. 24, 2021, the disclosure of which is incorporated herein by reference.

BACKGROUND

The present disclosure relates generally to cellular data processing and, in particular, to de-interleaving and rate recovery in a decoder of a cellular modem processor.

With the advent of high-speed cellular data communication, users of mobile devices are increasingly able to access information when and where they need it. Cellular data communication standards, promulgated by the 3rd Generation Partnership Project (3GPP), enable radio-frequency communication between a base station (typically implemented at a cellular antenna tower) and various user equipment (UE), which can be a mobile device such as a smart phone, tablet, wearable device, or the like, via an "uplink" from the UE to the base station and a "downlink" from the base station to the UE.

Standards promulgated by 3GPP include specifications for radio access networks (RANs), such as 4G Long-Term Evolution (referred to herein as "4G" or "LTE") and 5G New Radio (referred to herein as "5G" or "NR"). The 4G and 5G RAN specifications define multiple logical channels between the base station and the UE, including a physical uplink shared channel (PUSCH) and physical downlink shared channel (PDSCH) that transmit application-layer data, as well as a physical uplink control channel (PUCCH) and physical downlink control channel (PDCCH) that transmit control data used to specify various parameters associated with data transmission on the shared channels.

The specifications also define the sequence of operations used to prepare data for transmission as a radio-frequency (RF) signal on each channel. In the case of 5G PDSCH, for example, the sequence of operations includes channel coding using low-density parity check (LDPC) coding to produce a code block, followed by rate-matching (which involves duplicating some or all bits of the code block), then interleaving, which reorders the bits. After these encoding steps, scrambling is performed, and the bits are mapped onto symbols for transmission via a set of orthogonal frequency division multiplexing (OFDM) subcarriers. At the receiver side, the symbols are extracted from the received transmission, demapped, and descrambled to generate log likelihood ratios (LLRs) or other quantitative estimates of the relative probability that a particular bit of the encoded code block was 0 or 1. The original transmitted data is reconstructed by reversing the encoding steps: de-interleaving, followed by rate recovery (also called "de-rate-matching"), followed by LDPC decoding. To meet the throughput and latency demands of high-speed networks, efficient hardware implementations of the decoding process are desirable.

SUMMARY

According to some embodiments, a processing system is provided that can perform joint de-interleaving and rate recovery (or de-rate-matching) on data elements (e.g., log likelihood ratios, or LLRs) from a received transmission. The processing system can include a load engine that writes "new" data elements for a portion of a received code block into a de-interleaving buffer in a column-wise order and a de-rate-matching ("DRM") engine that reads the new data elements in row-wise order from the de-interleaving buffer and combines the data elements with stored data elements from a code-block buffer according to the position of the data elements in a code block, writing the updated data elements back to the code block buffer. The DRM engine can include a cache that stores recently updated data elements. The DRM engine can detect that an address collision will occur for a new data element, such as when the new data element corresponds to a position in the code block for which data is not yet ready to be read back from the code block buffer (e.g., due to read-after-write latency associated with the code block buffer). When an address collision is detected, the DRM engine can retrieve the previously-updated data element from the cache to be combined with the new data elements. In this manner, the DRM engine can avoid stalling the de-rate-matching pipeline due to address collisions, which can improve throughput.

Some embodiments relate to a circuit that can include a combiner unit, a cache, a code block buffer, a selection circuit, and a controller unit. The combiner unit can be configured to receive new data elements for a subset of positions in a code block and existing data elements for the subset of positions in the code block and can be configured to compute a plurality of updated data elements for the subset of positions in the code block. The cache can be coupled to the combiner unit and configured to receive and store the updated data elements. The code block buffer can be coupled to the combiner unit and configured to store a set of data elements for the code block at a plurality of locations such that different locations in the plurality of locations correspond to different positions in the code block; the code block buffer can be further configured to receive and store the plurality of updated data elements in the locations corresponding to the subset of positions in the code block. The selection circuit can be configured to receive a set of first input data elements from the cache and configured to receive a set of second input data elements from the code block buffer and to selectably provide either the first input data elements or the second input data elements as the existing data elements to the combiner unit. The controller unit can be coupled to the combiner unit, the cache, and the code block buffer, and the controller unit can be configured to: determine, based on a rate-matching pattern associated with the code block, a target location in the code block buffer for the new data elements; detect an address collision condition with respect to the target location; and control the cache, the code block buffer, and the selection circuit such that when the address collision condition is detected, the cache provides a cached set of updated data elements associated with the target location to the selection circuit and the selection circuit provides the first input data elements as the existing data elements to the combiner unit. In some embodiments, the controller unit is further configured such that when the address collision condition is not detected, the code block buffer provides the stored data elements from the target location to the selection circuit and the selection circuit provides the second input data elements as the existing data elements to the combiner unit.

In some embodiments, the cache can be configured to store the plurality of updated data elements in association with the address of the target location.

In some embodiments, the controller unit can be further configured to generate a write request to the code block buffer to write the updated data elements to the code block buffer, the write request including an address of the target location in the code block buffer.

In some embodiments, the controller unit can be further configured to detect the address collision condition when the target location overlaps with a previous target location from a previous write request to the code block buffer, where the previous write request was issued fewer than a threshold number of cycles previously. In some embodiments, the threshold number of cycles can be determined based on a read-after-write latency of the code block buffer.

In some embodiments, the circuit can also include a de-interleaving buffer configured to store data elements in an array having a plurality of rows and a plurality of columns, where the de-interleaving buffer has a storage capacity smaller than a size of the code block, and where data elements are written to the de-interleaving buffer in column-wise order. The circuit can also include a row selector circuit configured to provide a plurality of data elements from a selected one of the rows of the de-interleaving buffer to the combiner unit as the new data elements.

In some embodiments, the cache can include a number of entries sufficient to cover a read-after-write latency of the code block buffer.

Some embodiments relate to a cellular modem processor that can include a decoder pipeline, the decoder pipeline including a de-interleaving and rate recovery engine and a set of code block buffers. The de-interleaving and rate recovery engine can include a combiner unit, a cache, a code block buffer, a selection circuit, and a controller unit. The combiner unit can be configured to receive new data elements for a subset of positions in a code block and existing data elements for the subset of positions in the code block and can be configured to compute a plurality of updated data elements for the subset of positions in the code block. The cache can be coupled to the combiner unit and configured to receive the updated data elements. The code block buffer can be coupled to the combiner unit and configured to store a set of data elements for the code block at a plurality of locations such that different locations in the plurality of locations correspond to different positions in the code block; the code block buffer can be further configured to receive and store the plurality of updated data elements in the locations corresponding to the subset of positions in the code block. The selection circuit can be configured to receive a set of first input data elements from the cache and configured to receive a set of second input data elements from the code block buffer and to selectably provide either the first input data elements or the second input data elements as the existing data elements to the combiner unit. The controller unit can be coupled to the combiner unit, the cache, and the code block buffer, and the controller unit can be configured to: determine, based on a rate-matching pattern associated with the code block, a target location in the code block buffer for the new data elements; detect an address collision condition with respect to the target location; and control the cache, the code block buffer, and the selection circuit such that when the address collision condition is detected, the cache provides a cached set of updated data elements associated with the target location to the selection circuit and the selection circuit provides the first input data elements as the existing data elements to the combiner unit. In some embodiments, the controller unit is further configured such that when the address collision condition is not detected, the code block buffer provides the stored data elements from the target location to the selection circuit and the selection circuit provides the second input data elements as the existing data elements to the combiner unit.

In some embodiments, the decoder pipeline can also include one or more de-interleaving buffers and a load engine. The one or more de-interleaving buffers can be configured to store data elements in an array having rows and columns, and the de-interleaving buffers can have a storage capacity smaller than a maximum size for the code block. The load engine can be coupled to the de-interleaving buffers and configured to load data elements from a data element source into one of the de-interleaving buffer in a column-wise order. In some embodiments, the de-interleaving and rate recovery engine can also include a row selector circuit configured to provide data elements from a selected one of the rows of the de-interleaving buffer to the combiner unit as the new data elements. In some embodiments, the decoder pipeline can include at least two de-interleaving buffers, and the decoder pipeline can be configured such that the load engine loads data elements into a first one of the de-interleaving buffers while the row selector circuit reads from a second one of the de-interleaving buffers.

In some embodiments, the controller unit can be further configured such that when the address collision condition is not detected, the code block buffer provides the stored data elements from the target location to the selection circuit and the selection circuit provides the second input data elements as the existing data elements to the combiner unit.

In some embodiments, the controller unit can be further configured to generate a write request to the code block buffer to write the updated data elements to the code block buffer, and the write request can include an address of the target location in the code block buffer.

In some embodiments, the cache can be a write-through cache that provides the updated data elements for writing to the code block buffer at the target location.

In some embodiments, the decoder pipeline can be configured to decode a physical downlink shared channel (PDSCH) for a 5G radio access network.

Some embodiments relate to a method that can include: reading, by a selection circuit of a processing engine, of new data elements for a code block from a row of a de-interleaving buffer having an array of rows and columns to store data elements; determining, by a controller of the processing engine, a target address in a code block buffer for the new data elements based on a rate-matching pattern established for the code block; determining, by the controller, based on the target address, whether an address collision condition exists; when the address collision condition exists, selecting, by the controller a cache entry corresponding to the target address as a source location for a plurality of existing data elements; when the address collision condition does not exist, selecting, by the controller, a code block buffer as the source location for the plurality of existing data elements, where the plurality of existing data elements is read from the code block buffer using the target address; computing, by a combiner circuit of the processing engine, a plurality of updated data elements based on the new data elements and the existing data elements selected by the controller; and writing, by the processing engine, the updated data elements to the cache and to the code block buffer using the target address.

In some embodiments, the method can also include writing, by a load engine, data elements to the de-interleaving buffer, where the load engine writes the plurality of data elements to the de-interleaving buffer in a column-wise order. In some embodiments, reading the new data elements by the selection circuit can commence after writing the data elements by the load engine has completed. In some embodiments, writing the data elements to the de-interleaving buffer can include determining a number of active rows based on a configuration parameter associated with the code block, and the load engine can write the data elements to the active rows.

In some embodiments, determining whether the address collision condition exists can include determining whether the target address overlaps with a previous target address from a previous write request to the code block buffer, wherein the previous write request was issued fewer than a threshold number of cycles previously.

The following detailed description, together with the accompanying drawings, will provide a better understanding of the nature and advantages of the claimed subject matter.

BRIEF DESCRIPTION OF THE DRAWINGS

FIG. 5 shows a table illustrating how address collisions can occur in de-rate-matching.

DETAILED DESCRIPTION

The following description of exemplary embodiments is presented for the purpose of illustration and description. It is not intended to be exhaustive or to limit the claimed embodiments to the precise form described, and persons skilled in the art will appreciate that many modifications and variations are possible. The embodiments have been chosen and described in order to best explain their principles and practical applications to thereby enable others skilled in the art to best make and use various embodiments and with various modifications as are suited to the particular use contemplated.

Figure 1:
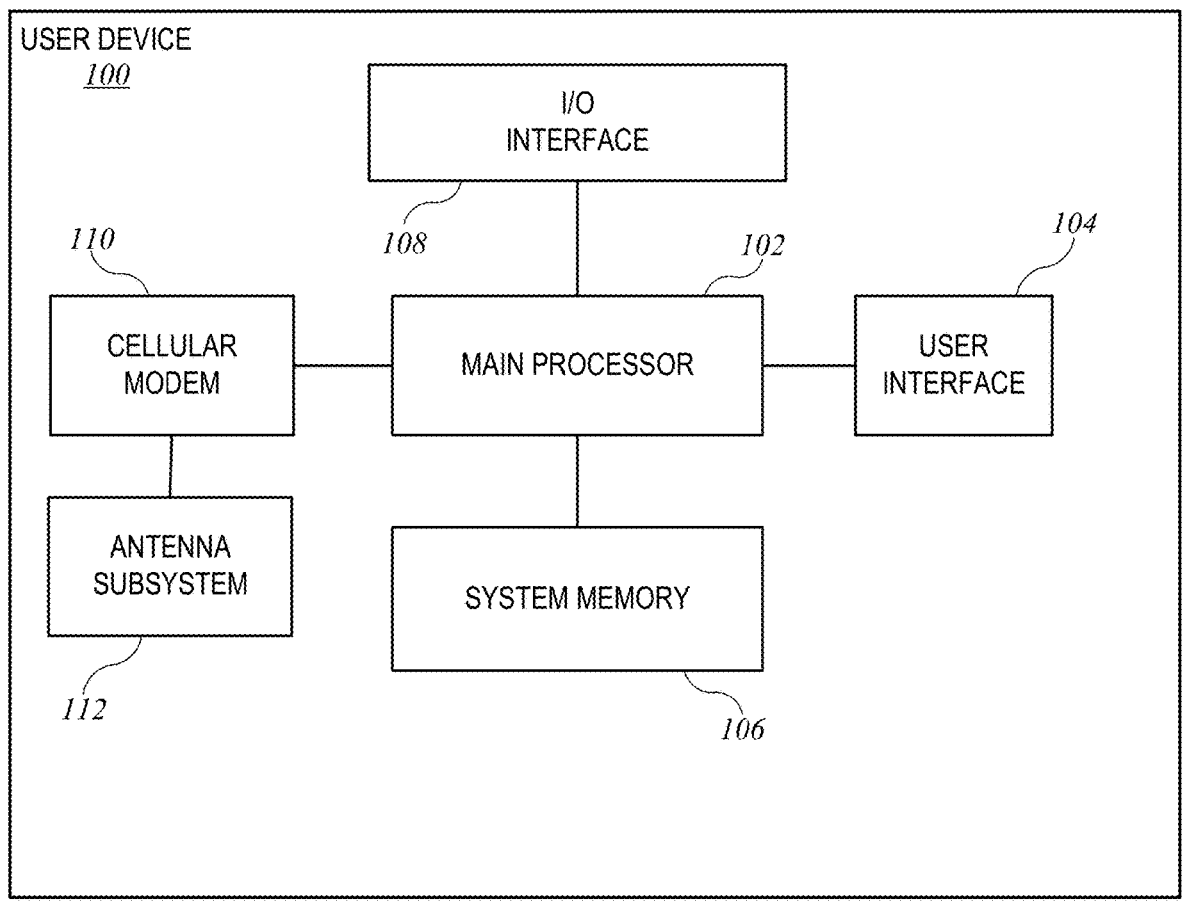
FIG. 1 is a simplified block diagram of a user device according to some embodiments.

FIG. 1 is a simplified block diagram of a user device 100 according to some embodiments. User device 100 can be, for example, a mobile device such as a smartphone, tablet computer, laptop computer, wearable device, or any other electronic device capable of operating as user equipment (UE) in a cellular radio access network. User device 100 is representative of a broad class of user-operable devices that may incorporate a cellular modem as described herein, and such devices can vary widely in capability, complexity, and form factor.

Main processor 102 can include, e.g., one or more single-core or multi-core microprocessors and/or microcontrollers executing program code to perform various functions associated with user device 100. For example, main processor 102 can execute an operating system and one or more application programs compatible with the operating system. In some instances, the program code may include instructions to send information to and/or receive information from other devices or systems, e.g., via a cellular data network such as a 4G or 5G network.

User interface 104 can include user-operable input components such as a touch pad, touch screen, scroll wheel, click wheel, dial, button, switch, keypad, keyboard, microphone, or the like, as well as output components such as a video screen, indicator lights, speakers, headphone jacks, haptic motors, or the like, together with supporting electronics (e.g., digital-to-analog or analog-to-digital converters, signal processors, or the like). Depending on the implementation of a particular user device 100, a user can operate input components of user interface 104 to invoke functionality of user device 100 and/or receive output from user device 100 via output components of user interface 104. In some embodiments, user device 100 may have a limited user interface (e.g., a small number of indicator lights and/or buttons) or no user interface.

System memory 106 can incorporate any type and combination of data storage media, including but not limited to random-access memory (e.g., DRAM, SRAM), flash memory, magnetic disk, optical storage media, or any other non-transitory storage medium, or a combination of media, and can include volatile and/or non-volatile media. System memory 106 can be used to store program code to be executed by main processor 102 and any other data or instructions that may be generated and/or used in the operation of user device 100.

Input/output (I/O) interface 108 can include hardware components and supporting software configured to allow user device 100 to communicate with other devices via point-to-point or local area network links. In some embodiments, I/O interface 108 can support short-range wireless communication (e.g., via Wi-Fi, Bluetooth, or other wireless transports) and can include appropriate transceiver and signal processing circuitry and software or firmware to control operation of the circuitry. Additionally or instead, in some embodiments, I/O interface 108 can support a wired connection to another device.

To enable communication via cellular networks, including cellular data communication, user device 100 can include a cellular modem 110 coupled to an antenna subsystem 112. Cellular modem 110 can be implemented as a microprocessor or microcontroller that acts as a co-processor to main processor 102. In some embodiments, cellular modem 110 and main processor 102 can be implemented as integrated circuits fabricated on a common substrate, e.g., as part of a system-on-a-chip design. Example implementations of cellular modem 110 are described below.

Antenna subsystem 112 can include an antenna, which can be implemented using a wire, metal traces, or any other structure capable of radiating radio-frequency (RF) electromagnetic fields and responding to RF electromagnetic fields at frequencies used in cellular data communication. For instance, 4G and 5G networks currently use various spectrum bands, including bands at 700 MHz, 850 MHz, 900 MHz, 1.5 GHz, 1.8 GHz, 2.1 GHz, 2.5 GHz, and 3.5 GHz. Antenna subsystem 112 can also include circuitry to drive the antenna and circuitry to generate digital signals in response to received RF signals. A particular antenna implementation is not critical to understanding the present disclosure, and those skilled in the art will know of numerous implementations. In some embodiments, antenna subsystem 112 can be shared between cellular modem 110 and I/O interface 108; for instance, the same antenna can be used to support any combination of cellular, Wi-Fi, and/or Bluetooth communications.

User device 100 can also include other components not shown in FIG. 1. For example, in various embodiments, user device 100 can include one or more data storage devices using fixed or removable storage media; a global positioning system (GPS) and/or other global navigation satellite system (GNSS) receiver; a camera; a microphone; a speaker; a power supply (e.g., a battery); power management circuitry; any number of environmental sensors (e.g., temperature sensor, pressure sensor, accelerometer, chemical sensor, optical sensor, etc.); and so on. Accordingly, user device 100 can provide a variety of functions, some or all of which may be enhanced by or reliant on cellular data communication supported by cellular modem 110.

Figure 2:
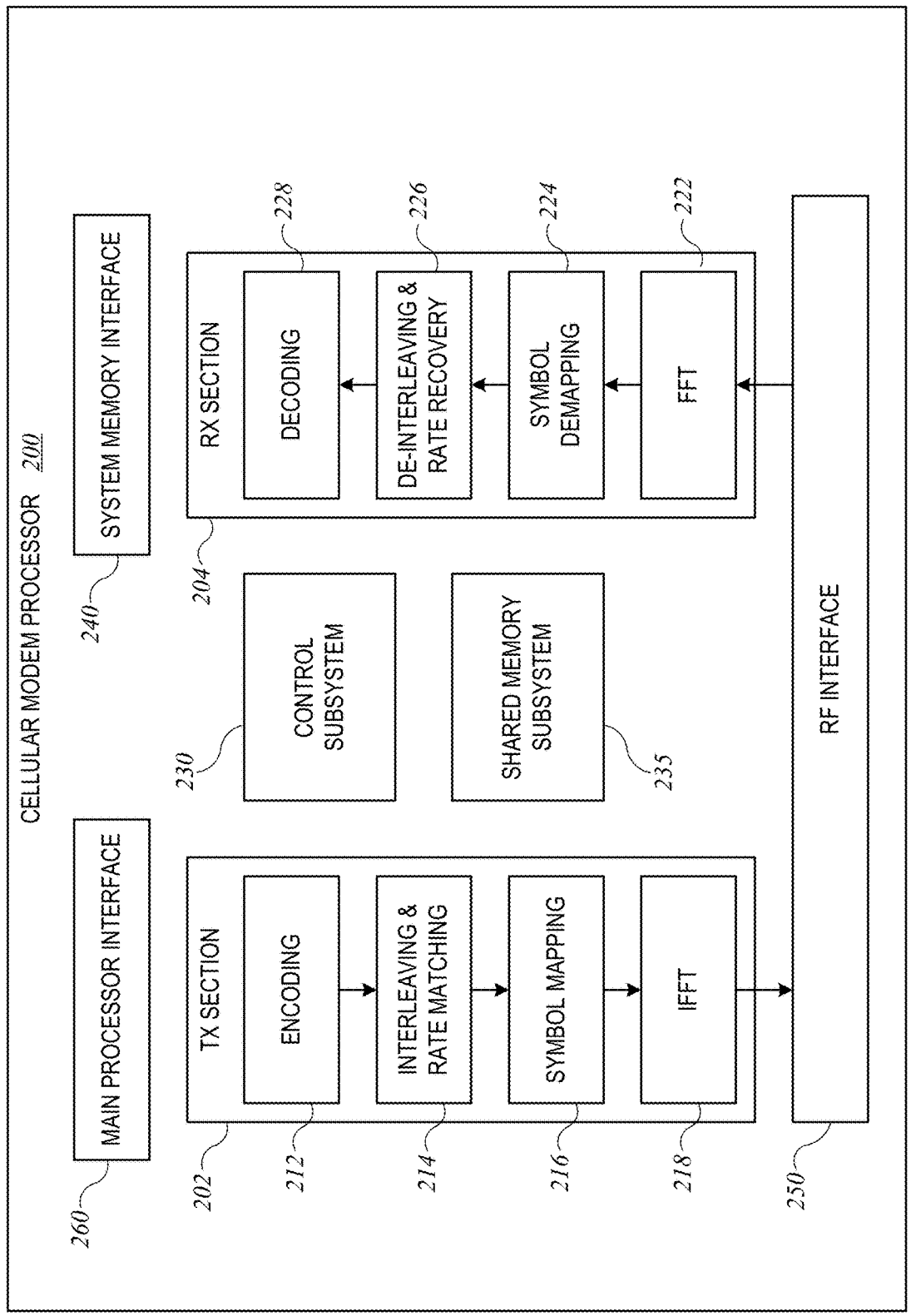
FIG. 2 is a simplified block diagram of a cellular modem processor according to some embodiments.

FIG. 2 is a simplified block diagram of a cellular modem processor 200 according to some embodiments. Cellular modem processor 200 can implement all or part of cellular modem 110 of FIG. 1. In various embodiments, cellular modem processor 200 can operate as user equipment (UE) in a cellular radio access network such as a 4G network and/or a 5G network.

Cellular modem processor 200 can include a transmit (TX) section 202 and a receive (RX) section 204. TX section 202 can include one or more data processing pipelines to prepare data for transmission via antenna subsystem 110, and RX section 204 can include one or more data processing pipelines to reconstruct transmitted data from signals received via antenna subsystem 110. Cellular modem processor 200 can also include a control subsystem 230, a shared memory subsystem 235 and various interfaces to other system components, such as a system memory interface 240, an RF interface 250, and a main processor interface 260.

Data processing pipelines in TX section 202 and RX section 204 can include logic circuitry (e.g., any combination of fixed-function and/or programmable circuitry) that implements a specific sequence of operations and associated storage circuitry (e.g., registers, data buffers, and/or other memory circuits) to store data being operated on. The operations can conform to the specifications of a particular cellular data network, including 4G and/or 5G networks. For example, shown in TX section 202 are an encoding unit 212, an interleaving and rate-matching unit 214, a symbol mapping unit 216, and an inverse Fast Fourier Transform (IFFT) unit 218. Encoding unit 212 can perform code block segmentation and channel coding for a particular channel (e.g., for PUCCH or PUSCH). The encoding operations can be specific to a particular channel and/or a particular communication standard. For instance, 4G PUSCH channel coding operations can include CRC (cyclic redundancy check) calculation and Turbo coding; 4G PUCCH channel coding operations can include CRC calculation and convolutional coding; 5G PUSCH channel coding operations can include CRC calculation and low-density parity check (LDPC) coding; and 5G PUCCH channel coding operations can include CRC calculation and polar coding. Interleaving and rate-matching unit 214 can perform interleaving and rate matching operations on encoded code blocks. As with encoding operations, interleaving and rate matching operations can depend on the particular channel and/or particular communication standard. For instance, in 4G PUSCH, interleaving precedes rate matching, while 5G PUSCH reverses the order. Symbol mapping unit 216 can receive bit sequences for code blocks after encoding, rate-matching and interleaving and can map the bit sequences onto symbols in an appropriate constellation for each of a set of orthogonal frequency division multiplexing (OFDM) subcarriers. Again, the mapping can depend on the particular channel and/or communication standard. Due to such differences, dedicated hardware pipelines can be constructed to support different physical channels (e.g., PUSCH vs. PUCCH) and/or different communication standards (e.g., 4G vs. 5G), or multipurpose pipelines that share hardware can be constructed. IFFT unit 218 receives the symbols from symbol mapping unit 216. Each symbol can be, e.g., a complex number representing an amplitude and phase. IFFT unit 218 can perform an IFFT to transform the symbols to a sample sequence in the time domain. This sample sequence can be provided to RF interface 250.

RF interface 250 can be an interface to antenna subsystem 112 of FIG. 1 and can convert the sample sequence to an analog signal that is mixed onto the carrier frequency and transmitted via an antenna. RF interface 250 can also down-convert received RF signals to baseband and convert the baseband analog signal to a sequence of digital samples. Digital sample sequences can be provided to pipelines in RX section 204.

As with TX section 202, operations in RX section 204 can conform to the specifications of a particular cellular data network, including 4G and/or 5G networks. For example, shown in RX section 204 are a Fast Fourier Transform (FFT) unit 222, a symbol demapping unit 224, a de-interleaving and rate recovery unit 226, and a decoding unit 228. FFT unit 222 can receive, via RF interface 250, a sequence of samples representing a received (baseband) signal and can perform an FFT to transform the samples from time domain to frequency domain. Symbol demapping unit 224 can perform demapping and symbol-decoding operations to generate a representation of the bits that were transmitted. The decoding operation can be a soft decoding operation that produces log likelihood ratios (LLRs) or other estimates of the relative probability of a given bit being 0 or 1. De-interleaving and rate recovery unit 226 can reverse the interleaving and rate matching operations that were performed at the transmitter. Decoding unit 228 can perform channel decoding to decode the code blocks and recover the data. As with corresponding components in TX section 204, the operations implemented in demapping unit 224, de-interleaving and rate recovery unit 226, and decoding unit 228 can be specific to a particular channel and/or a particular communication standard. Due to such differences, dedicated hardware pipelines can be constructed to support different physical channels (e.g., PDSCH vs. PDCCH) and/or different communication standards (e.g., 4G vs. 5G), or multipurpose pipelines that share hardware can be constructed.

Operation of the pipelines in TX section 202 and RX section 204 can be coordinated by control subsystem 230. Control subsystem 230 can include circuitry to manage communication between units in TX section 202 and RX section 204 and other components of cellular modem processor 200 (e.g., RF interface 250, main processor interface 260, and system memory interface 240) and/or between cellular modem processor 200 and other components of a device or system (e.g., user device 100 of FIG. 1) in which cellular modem processor 200 operates. A variety of implementations can be used, including various combinations of fixed-function circuitry and programmable circuitry executing program code provided as firmware. Shared memory subsystem 235 can include memory circuits (e.g., SRAM, DRAM, or the like), a read interface and a write interface connected via crossbars to TX section 202 and RX section 204 (or to individual units in TX section 202 and/or RX section 204), and arbitration logic to manage multiple requests (e.g., using time division multiplexing or other techniques). In some embodiments, shared memory subsystem 235 can be implemented such that any unit in TX section 202 or RX section 204 can access any location in the shared memory. A variety of architectures, including conventional architectures, can be used. In some embodiments, shared memory subsystem 235 can be used to transfer data into and out of TX section 202 and/or RX section 204, or between units within TX section 202 and/or RX section 204.

Main processor interface 260 can enable communicating with main processor 102 (shown in FIG. 1), via an interface such as Advanced eXtensible Interface (AXI), which is part of ARM Advanced Microcontroller Bus Architecture, or any other suitable interface for communication between a main processor and a coprocessor. Other interfaces to other components of user device 100 can also be provided, such as a system memory interface 240 that provides a direct memory access (DMA) interface to transfer data between shared memory subsystem 235 and system memory 106 of FIG. 1.

It will be appreciated that cellular modem processor 200 is illustrative and that variations and modifications are possible. A cellular modem processor can include any number and combination of pipelines, supporting any number and combination of cellular data communication standards. Control subsystems, memory subsystems and interfaces to other components can be varied as desired. In some embodiments, cellular modem processor 200 can have a high throughput to support high-speed cellular networks (e.g., 12 Gbps for a 5G network).

To provide high throughput, a cellular modem processor can include a number of pipelines, where each pipeline can include a number of dedicated circuits configured to perform specific operations associated with data communication; examples include encoding, decoding, interleaving, rate matching, de-interleaving, de-rate-matching, computing cyclic redundancy check (CRC) bits, performing CRC, and so on. In some embodiments, some or all of the pipelines can be implemented using a general architectural framework that provides flexible (firmware-based) control with a data synchronization mechanism that is independent of the particular functionality of a pipeline or pipeline stage. For example, joint de-interleaving and rate recovery systems as described herein can be incorporated into a 5G PDSCH decoding pipeline as described in above-referenced U.S. application Ser. No. 17/448,867. However, those skilled in the art will appreciate that joint de-interleaving and rate recovery systems and methods of the kind described herein can be employed in a variety of contexts, not limited to any particular pipeline architecture.

Both 4G and 5G radio access networks use interleaving and rate matching for code blocks in the shared channels (PUSCH and PDSCH). Rate matching is a process by which all or part of a bit sequence such as a code block is repeated. Conceptually, rate matching involves writing the bit sequence (e.g., the code block) in order to a circular buffer, then reading bits sequentially from the circular buffer (wrapping from the end to the beginning) according to a rate-matching pattern that specifies a starting offset and number of bits to read. The number of bits to read can exceed the number of bits in the bit sequence, resulting in repetition of all or part of the bit sequence. A particular rate-matching pattern can be selected based on channel conditions and/or other considerations related to available resources. Conceptually, interleaving is a process in which a bit sequence is written into positions of an array in a row-wise order, then read out in column-wise order, thereby reordering the bits in a predictable pattern. The number of rows can be equal to the OFDM modulation order. At the receiver side, recovery of the code block includes undoing the rate matching and interleaving processes (in reverse order). Typically, the receiver does not know the exact bit values of the transmitted sequence. Instead, the receiver extracts a sequence of data elements indicating the relative probability that each bit was a 0 or 1. The relative probability is commonly expressed as a log likelihood ratio (LLR), and the following description refers to the data elements as LLRs.

Both 4G and 5G radio access networks specify standard processes for interleaving and rate matching. In 4G shared channels (PUSCH and PDSCH), interleaving precedes rate matching, and it is standard practice for the receiver to include a de-interleaving buffer that is large enough to store all bits of the (de-rate-matched) code block. De-rate-matching is accomplished by sequentially adding received LLRs to a running sum of LLRs for the corresponding bit position in the code block. The bit positions can be arranged column-wise in the de-interleaving buffer. After de-rate-matching, de-interleaving can be accomplished by reading out the de-interleaving buffer in row-wise order.

In 5G shared channels, on the other hand, rate-matching precedes interleaving. This order of operations provides certain advantages over 4G in terms of increasing robustness against channel losses. However, it can pose a challenge for the receiver. For instance, an encoded 5G shared-channel code block can include up to 25,344 bits. Rate matching can increase the number of bits by as much as a factor of 10, resulting in roughly 250,000 LLRs to be de-interleaved at the receiver. Using the 4G de-interleaving approach would require a very large de-interleaving buffer (e.g., around 1.5 Mb).

One approach to reducing the size of the de-interleaving buffer is to combine de-interleaving and de-rate-matching. The transmitted code block can be divided into smaller "chunks" that can be handled separately. A chunk can be, for example, about 1/10 the size of the maximum code block size defined in the standard (or other size as desired). LLRs for a chunk of an as-transmitted code block can be written into a de-interleaving buffer (e.g., in column-wise order) and read out in de-interleaved order, e.g., row by row. The de-interleaving buffer can be sized according to the chunk size. A separate code block buffer can be provided with enough capacity to store an LLR for each bit position in the (de-rate-matched) code block. Each LLR read from the de-interleaving buffer can be combined with a previously-stored LLR at the appropriate position in the code block buffer, e.g., via read-modify-write with the appropriate target address in the code block buffer. However, this approach can lead to address collisions in the code-block buffer. For instance, suppose that a first LLR corresponding to position k in the code block is read from the de-interleaving buffer, and a read-modify-write operation is performed for the address (Ak) in the code block buffer that corresponds to position k in the code block. If a second LLR corresponding to the same position k in the code block is received, it is necessary to wait for the updated LLR to be written into the code block buffer then read out again. Waiting for data can reduce throughput of the de-interleaving and rate recovery process. Depending on the rate-matching pattern, which determines the order of memory accesses to the code block buffer, the reduction in throughput can be significant.

Some embodiments provide circuits and methods for joint de-interleaving and rate recovery that can reduce the effect of address collisions on throughput. For example, a cache can be provided to store recently updated LLRs, and any read requests targeting a recently updated location in the code block buffer can be serviced from the cache, which can prevent stalls.

Figure 3:
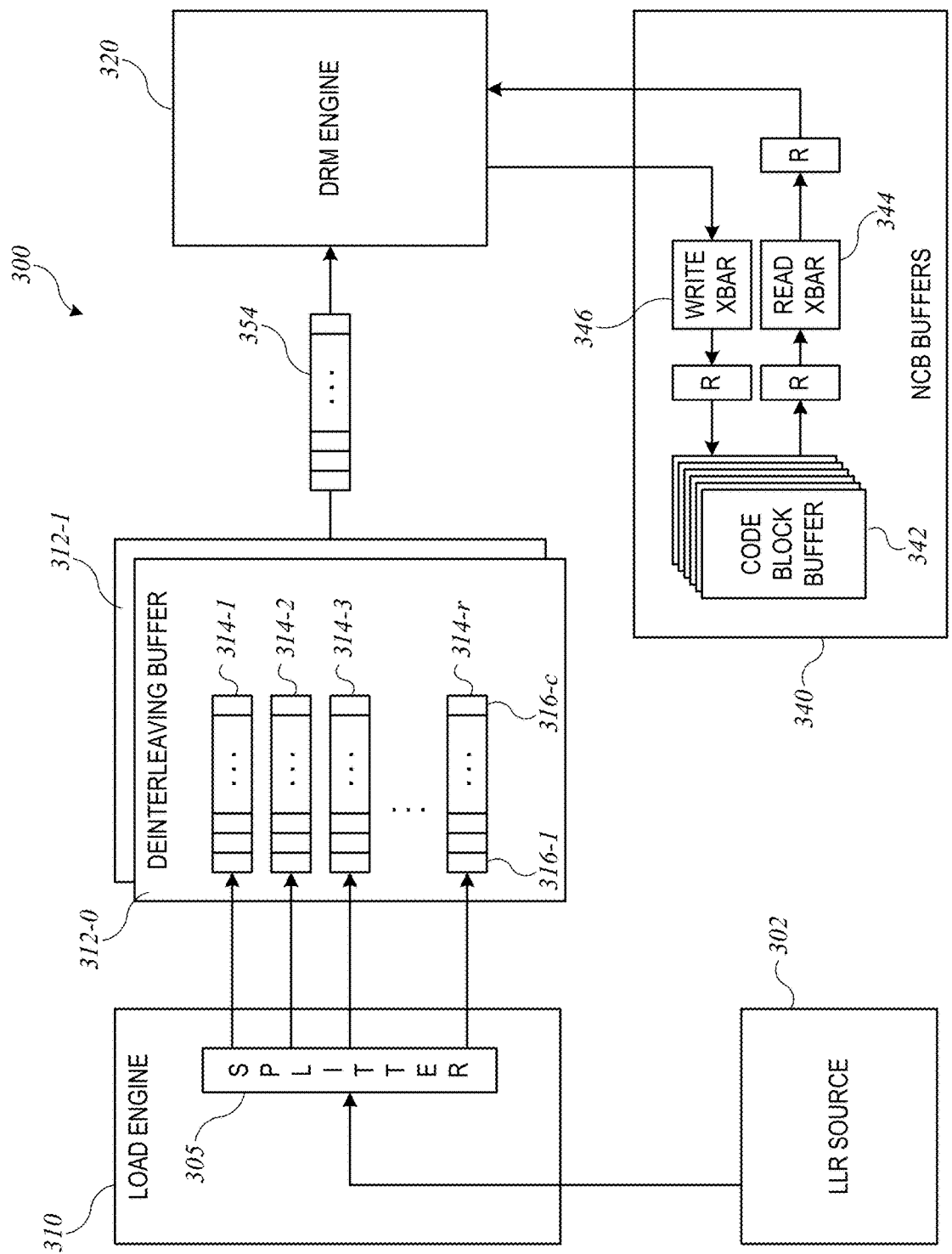
FIG. 3 shows a simplified schematic diagram of a joint interleaving and rate recovery system according to some embodiments.

FIG. 3 shows a simplified schematic diagram of a joint interleaving and rate recovery system 300 according to some embodiments. System 300 can be incorporated into a receiver device, such as cellular modem processor 200 of FIG. 2. System 300 can operate in real time to perform de-interleaving and rate recovery on a sequence of LLRs (or other data elements) extracted from a received signal. (The particular manner in which LLRs or other data elements are extracted from the received signal is not relevant to understanding this disclosure.) System 300 can include a load engine 310; one or more de-interleaving buffers 312; a de-rate-matching ("DRM") engine 320; and code block ("NCB") buffers 340.

Load engine 310 can receive LLRs from an LLR source 302 and write the LLRs in order into a de-interleaving buffer 312-0. LLR source 302 can include any combination of logic and/or storage circuits configured to generate and/or store a sequence of LLRs. For example, where system 300 is implemented in a pipeline in cellular modem processor 200 of FIG. 2, LLRs can be generated via demodulation and demapping processes (e.g., in a pipeline implementing symbol demapping unit 224 of processor 200) and stored in shared memory subsystem 235. Load engine 310 can read the LLRs from shared memory 235 (which can act as LLR source 302) and load the LLRs into de-interleaving buffer 312-0. In some embodiments, two (or more) de-interleaving buffers 312-0, 312-1 can be provided. A ping-pong or cyclic operation can be enabled in which load engine 310 writes LLRs to one de-interleaving buffer (e.g., buffer 312-0) while DRM engine 320 reads from a different de-interleaving buffer (e.g., buffer 312-1). After load engine 310 and DRM engine 320 have completed their respective operations, load engine 310 and DRM engine 320 can switch to using another buffer. The switching can be synchronized to avoid errors such as overwriting data that has not yet been read or attempting to read data that has not yet been written. This ping-pong or cyclic operation can reduce the amount of time either engine spends waiting for a de-interleaving buffer 312 to become available.

As shown for buffer 312-0, each de-interleaving buffer can include an array having number (R) of rows 314-1 through 314-R and a number (C) of columns 316-1 through 316-C. Each (row, column) position in the array can provide a storage location for an LLR (which can be, e.g., a 6-bit or 8-bit number). In some embodiments, the number R of rows 314 can be chosen according to the interleaving scheme(s) enabled at the transmitter. For example, in the 5G shared channels, the transmitter interleaves bits using an interleaving width that corresponds to the modulation order (which is the number of bits represented in the symbol constellation used for OFDM modulation). 5G supports constellations up to 1024QAM (modulation order 10). Accordingly, in some embodiments, R=10 can be chosen. Where a smaller modulation order is in use for a particular code block, a subset of rows 314 corresponding to the current modulation order can be active and the remaining rows can be inactive. The number C of columns 316 can be selected based on design considerations such as the degree of parallelism desired for DRM engine 320. For example, some embodiments of DRM engine 320 can read 32 LLRs in parallel from NCB buffers 340, and it may be desirable to have DRM engine operate on 32 LLRs in parallel. Accordingly, C=32 can be chosen. Other combinations of R and C can also be used. The number of LLRs (R*C) in each de-interleaving buffer 312-0, 312-1 can be smaller than the size of a code block, and buffers 312-0, 312-1 can be written and read multiple times to perform de-interleaving and rate recovery for a given code block.

In operation, load engine 310 can receive LLRs in order from LLR source 302, and write a set of LLRs in column-wise order to de-interleaving buffer 312-0 (or de-interleaving buffer 312-1). For example, load engine 310 can include a splitter mux 305 that directs consecutive LLRs from LLR source 302 into successive rows 314 of de-interleaving buffer 312. In some embodiments, the number of active rows 314 in de-interleaving buffer 312-0 can be a configurable parameter of load engine 310, and load engine 310 can load LLRs into the active rows, skipping over inactive rows, e.g., by controlling splitter mux 305 accordingly. The number of active rows can be determined based on the modulation order (or interleaving width) used at the transmitter, which the receiver can determine using appropriate techniques (e.g., by decoding downlink control information received via PDCCH in a 5G network).

After load engine 310 has finished writing LLRs to a particular de-interleaving buffer 312-$i$, DRM engine 320 can read LLRs row-wise (as shown by LLR row 354) from that de-interleaving buffer 312-$i$. In some embodiments, DRM engine 320 can be pipelined to read one row of LLRs per cycle and synchronously perform read-modify-write operations to update the corresponding LLRs for the code block stored in NCB buffers 340. Throughput of one row of LLRs per cycle can be maintained using techniques described below.

NCB buffers 340 can include one or more code block buffers 342. Each code block buffer 342 can be a memory circuit of sufficient size to store all LLRs for a de-rate-matched code block of maximum size for a particular implementation. For instance, a memory size of 25,600 LLRs would be sufficient for the maximum code block size in a 5G shared channel. Code block buffers 342 can be implemented using any type of memory circuit including SDRAM, flash, or other addressable memory circuits. NCB buffers 340 can also include an interface to support reading and writing of code block buffers 342 as a unified memory subsystem. For instance, code block buffers 342 can be implemented as single-port memory circuits with rows that are 64 LLRs wide; with time division multiplexing, such an implementation of NCB buffers 340 can support reading and writing of up to 32 LLRs per cycle. Other implementations, including dual-port memory and different read/write widths, are possible, and an optimal choice involves design tradeoffs between area and throughput. In some embodiments, NCB buffers 340 can include a read crossbar 344 and a write crossbar 346 that can facilitate access to any of code block buffers 342. For example, DRM engine 320 can read from and write to any location in any of code block buffers 342. In some embodiments, NCB buffers 340 can be shared between DRM engine 320 and other processing engines, such as an LDPC decoder engine to decode the code blocks after rate recovery. In some embodiments, different code block buffers 342 can be allocated to different processing engines at any given time, to avoid data synchronization errors between different processing engines. For instance, DRM engine 320 can use a first code block buffer 342 to perform rate recovery as described herein while an LDPC decoder engine decodes a previously de-rate-matched (and de-interleaved) code block stored in a second code block buffer 342. After completing rate recovery for the code block in the first code block buffer 342, DRM engine 320 can begin rate recovery for the next code block using a different code block buffer 342

In various embodiments, NCB buffers 340 can have a read-after-write latency (the time needed to write data, then read back the new data) that is longer than one clock cycle; that is, it can take several cycles to write data to NCB buffers 340, then read the newly-written data back from NCB buffers 340. In instances where access to NCB buffers 340 is shared with other processing engines, additional arbitration latency may occur. (Those skilled in the art will understand that memory latency depends on the particular architecture of the memory system.) By way of example, read-after-write latency in some architectures can be six or eight cycles.

Figure 4:
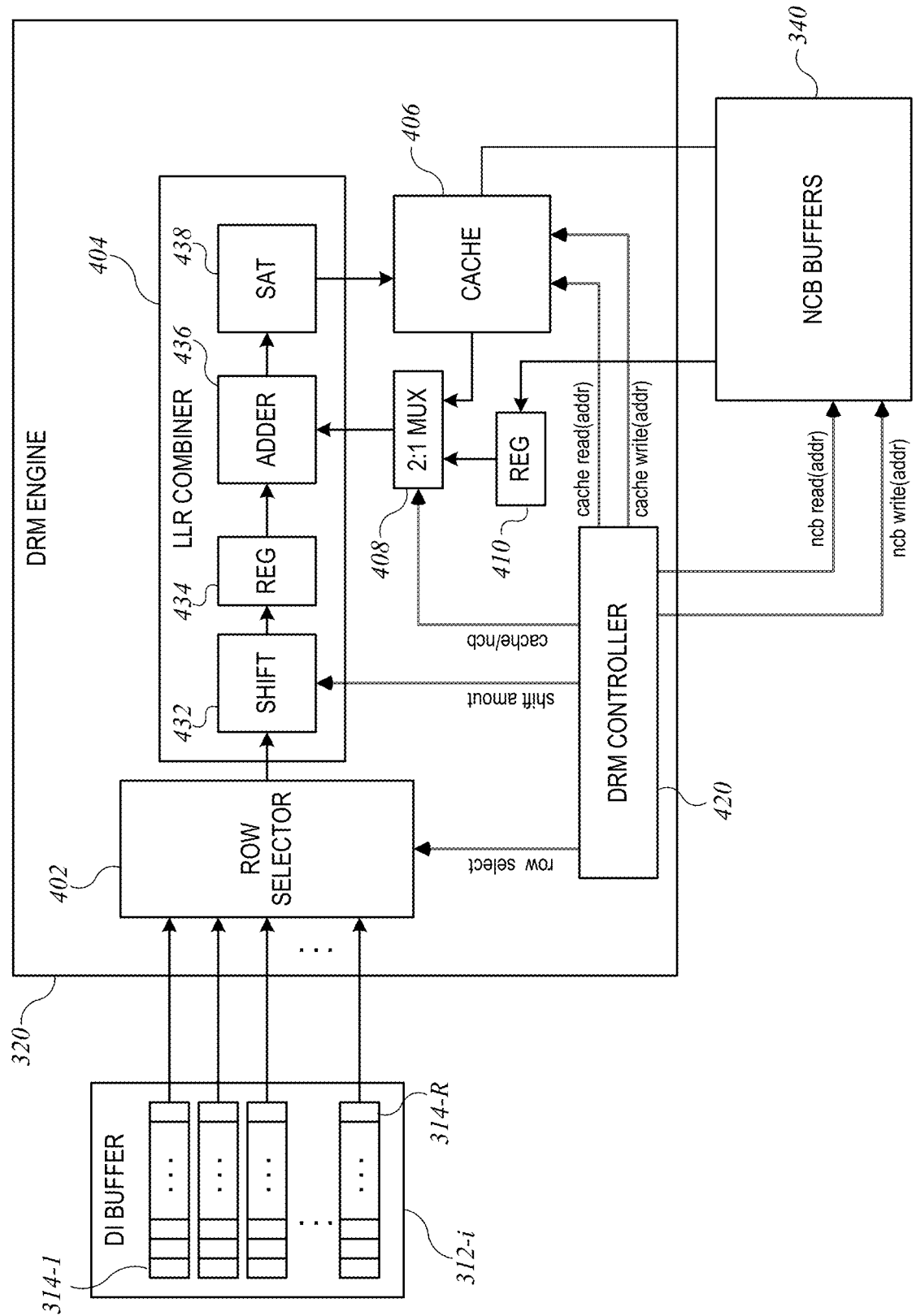
FIG. 4 shows a simplified schematic diagram of a de-rate-matching engine according to some embodiments.

In some embodiments, DRM engine 320 can include a cache to store recently updated LLRs, so that the updated LLRs are accessible for further updates within a time shorter than the read-after-write latency of NCB buffer 340. FIG. 4 shows a simplified schematic diagram of DRM engine 320 according to some embodiments. DRM engine 320 can include a row selector circuit 402, an LLR combiner unit 404, a cache 406, a selection multiplexer (mux) 408, a register 410, and a DRM controller 420. In this example, DRM engine 320 can operate in parallel on an LLR group that includes the C LLRs from one row 314 of de-interleaving buffer 312-$i$ (which can be, e.g., either buffer 312-0 or 312-1 of FIG. 3). Other degrees of parallelism can be implemented if desired and, depending on implementation, DRM engine 320 can operate on one or more LLRs at a time.

DRM controller 420 can be implemented using programmable or fixed-function logic circuitry, or a combination thereof. In some embodiments, DRM controller 420 coordinates operation of other components of DRM engine 320 to read LLRs from de-interleaving buffer 312-$i$ (in de-interleaved order) and to perform de-rate-matching by combining newly received LLRs with previously-received LLRs corresponding to the same bit position in a code block. Specific examples of configuration and operation of DRM controller 420 are described below.

Row selector circuit 402 can be a selection mux having R input paths and one output path, with each input and output path being wide enough to carry an LLR group (e.g., all LLRs from one row 314 of de-interleaving buffer 312). For instance, if a row 314 has C=32 LLRs and each LLR is 6 bits, the paths would be 192 bits wide. Row selector circuit 402 can receive a row selection signal from DRM controller 420 identifying a current row and can output the LLRs of the selected row as an LLR group. In some embodiments, row selection can be controlled by a counter that advances sequentially through the active rows of de-interleaving buffer 312-$i$. (As described above, some rows of de-interleaving buffer 312-$i$ may be inactive for a particular code block.)

LLR combiner unit 404 can include arithmetic logic circuitry to update existing LLRs (stored in NCB buffers 340, e.g., in one of code block buffers 342 as describe above) using the new LLR group provided by row selector circuit 402. For example, LLR combiner unit 404 can include a shift circuit 432, a register 434, an adder unit 436, and a saturation unit 438. Shift circuit 432 can shift the new LLRs to align with a group of existing LLRs. For example, NCB buffer reads and writes may be aligned with memory row boundaries in NCB buffers 340, but a received row of LLRs might not start at the boundary. In some embodiments, DRM controller 420 can determine the appropriate shift amount and provide a control signal to shift circuit 432. Adder unit 436 can include a set of C parallel adder circuits that receive a new LLR as one input and an existing LLR (via mux 408 as described below) as the other input. In some embodiments, each adder circuit in adder unit 436 can be wider than a single LLR, to allow for a larger range of values due to accumulation. For example, if an LLR is 6 bits, each adder circuit can be an 8-bit adder circuit. Register 434 can be used to synchronize the arrival of the new LLR group at adder unit 436 with the arrival of an existing LLR group via mux 408. Saturation unit 438 can apply saturation logic in parallel to the C sums produced by adder unit 436, yielding an updated LLR group. Saturation unit 438 can provide the updated LLR group to cache 406. Other implementations and combinations of circuitry to combine LLRs (or other data elements) can be substituted.

Cache 406 can be implemented using registers or similar storage circuits such that data written in one cycle is available for reading on the next cycle. Cache 406 can include any number of entries. To avoid pipeline delays due to address collisions in NCB buffers 340, the number of entries can be sufficient to cover the read-after-write latency for NCB buffers 340. For instance, if the read-after-write latency for NCB buffers 340 is seven cycles, then cache 406 may have eight or ten entries. More generally, if read-after-write latency for NCB buffer 340 is L cycles, cache 406 can have L or more entries, such as L+1, L+2, or some other number. Cache 406 can have as many entries as desired, although (as will become apparent) increasing the number of entries beyond the number needed to avoid pipeline delays might not provide a benefit sufficient to offset the larger cache size. In some embodiments, cache 406 can be a fully associative write-through cache; other cache implementations can also be used. Each entry can store an LLR group in association with an address (which can be the same as the address in NCB buffers 340 for the LLR group). An address to associate with an updated LLR group received from saturation unit 438 can be provided to cache 406 using a "cache write" signal from DRM controller 420, which can be synchronized with receipt of the updated LLR group. In some embodiments, cache 406 can implement a first-in, first-out (FIFO) replacement policy, in which a new entry added to cache 406 replaces the oldest entry. Cache 406 can be configured to allow multiple entries to have the same associated address, and address ambiguity can be resolved in favor of the newer (or newest) entry. Other replacement policies can also be used. LLR groups written to cache 406 can also be written through to NCB buffer 340. In some embodiments, DRM controller 420 can provide the write address for the LLR group to NCB buffers 340 using an "ncb write" signal.

Existing LLR groups can be read from either NCB buffers 340 or cache 406. For instance, DRM controller 420 can send a read request to NCB buffers 340 using an address of the existing LLR group that correspond to the same bit positions as the new LLR group. In some embodiments, a single read request can be used to retrieve the existing LLR group. The existing LLR group retrieved from NCB buffers 340 can be written to register 410, which can be used to synchronize the arrival of the existing LLR group from NCB buffer 340 with operation of multiplexer 408. In addition to or instead of sending a read request to NCB buffers 340, DRM controller 420 can send a read request to cache 406; for instance, DRM controller 420 can send a read request to cache 406 if the NCB buffer address was recently accessed in connection with another new LLR group. In some embodiments, the address sent to cache 406 can be the same address sent to NCB buffers 340. If the address hits in cache 406, cache 406 can provide the corresponding LLR group to mux 408. DRM controller 420 can send a "cache/NCB" selection signal to mux 408 so that the existing LLR group is provided to adder unit 436 from the appropriate source.

In some embodiments, DRM controller 420 can synchronize operations of the various components of DRM engine 320 to provide a sustained throughput of one LLR group per cycle. For example, DRM controller 420 can define a mapping between addresses in NCB buffers 340 and positions in the code block. This mapping can be fixed and in some embodiments can be as simple as sequential addresses corresponding to sequential positions in the code block. DRM controller 420 can be configured with information specifying the rate-matching pattern that was used at the transmitter. Where the rate-matching pattern is variable for different code blocks (as is the case in 5G networks), the receiver in which DRM engine 320 operates can determine the rate-matching pattern using appropriate techniques (e.g., by decoding downlink control information received via PDCCH in a 5G network) and can provide the information to DRM controller 420.

The rate-matching pattern determines which LLRs in the de-interleaved sequence correspond to which positions in the code block. Accordingly, DRM controller 420 can determine the address(es) in NCB buffers 340 that will need to be accessed for a particular LLR group even before the LLR group is read from de-interleaving buffer 312. DRM controller 420 can account for the read latency of NCB buffers 340 by generating the NCB read request for an existing LLR group corresponding to a given new LLR group far enough in advance of the new LLR group reaching register 434 that the existing LLR group can be ready in register 410 by the time the new LLR group reaches register 434. As long as different new LLR groups map to different, non-overlapping locations (or addresses) in NCB buffers 340, NCB buffers 340 can service the memory requests without introducing delay into the DRM pipeline. It should be understood that registers 410 and 434 can be used to facilitate data synchronization in some pipelined implementations; in various embodiments, registers 410 and 434 can be omitted, or other registers can be included.

In some instances, however, some or all of the LLRs in a second new LLR group may map to the same position in the code block (which implies the same location (or address) in NCB buffers 340) as a first new LLR group, and the updated LLR group resulting from the first new LLR group may be needed for combining with the second new LLR group before the first update can be written to NCB buffers 340 and read back again. This situation is referred to herein as an address collision (or address conflict). FIG. 5 shows a table 500 illustrating an example of how address collisions can occur in de-rate-matching. In table 500, eight rows are active in de-interleaving buffer (e.g., corresponding to the interleaving width in a 5G shared channel using 256QAM (quadrature amplitude modulation)). A row index in column 501 identifies the rows. For each row in this example, 16 LLRs (columns 502) are shown. For each LLR, the cell in table 500 indicates the position of the corresponding bit in the code block, using numbers to indicate bit positions. LLRs with the same position number correspond to the same bit in the code block and should be combined by DRM engine 320. In the example shown, rows 0, 2, 4, and 6 have LLRs with the same position numbers, and rows 1, 3, 5, and 7 have LLRs with the same position numbers. Assuming that rows are processed sequentially and that the read-after-write latency of NCB buffer 340 is more than two cycles, address collisions occur for each of rows 2-7.

In embodiments described herein, DRM controller 420 has the rate-matching pattern (e.g., the pattern shown in table 500) and can detect address collisions, e.g., by comparing position numbers (or NCB buffer addresses) of the LLRs in different rows. When an address collision is detected, DRM controller 420 can issue a cache read request, with appropriate timing so that the existing LLR group is selected by mux 408 and delivered to adder unit 436 synchronously with the new LLR group. Since the addresses can be determined before any LLRs are read into DRM engine 320, DRM controller 420 can issue the appropriate read requests to cache 406 and NCB buffers 340 and send appropriate control signals to mux 408 so that throughput of one LLR group per cycle can be maintained, regardless of whether and how often address collisions occur. It should be understood that DRM controller 420 can also generate other timing signals not shown in FIG. 4, such as enable signals to various registers (e.g., registers 434, 410) and logic circuits (e.g., shifter circuit 432, adder unit 436, saturation unit 438).

Figure 6:
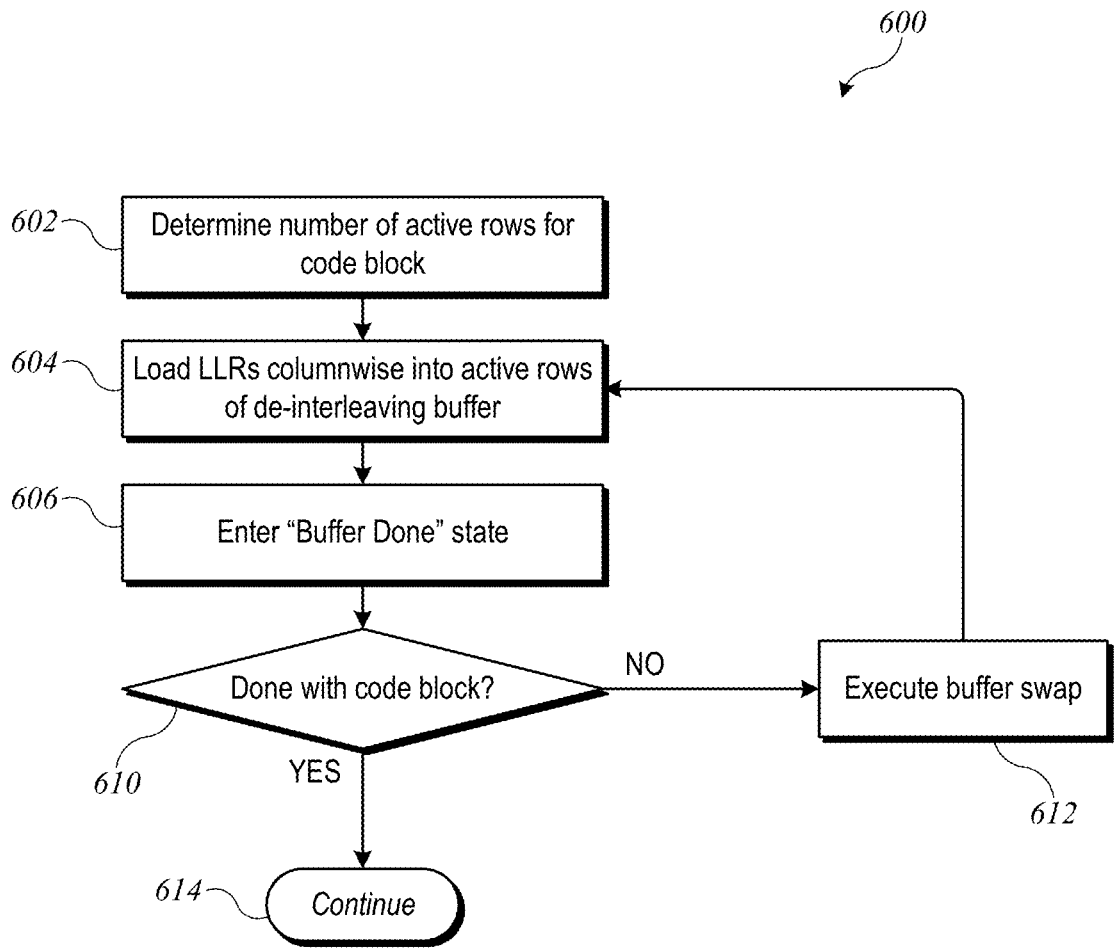
FIG. 6 is a flow diagram of a process for loading a de-interleaving buffer according to some embodiments.
Figure 7:
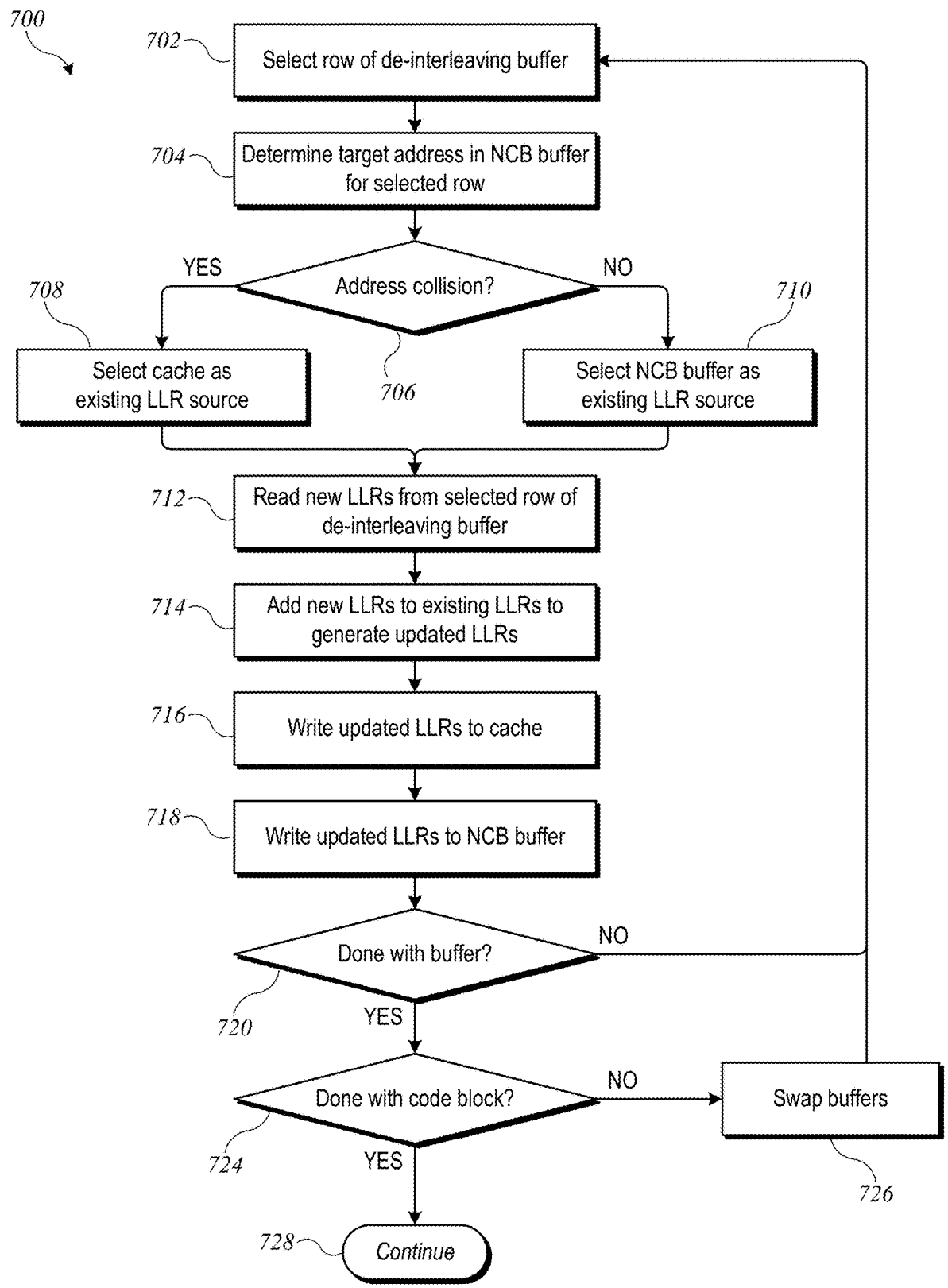
FIG. 7 shows a flow diagram of a process for de-rate-matching according to some embodiments.

Operation of system 300 to perform joint de-interleaving and rate recovery can be further understood with reference to FIGS. 6 and 7. FIG. 6 is a flow diagram of a process 600 that can be implemented in a load engine (e.g., load engine 310 of system 300) according to some embodiments. Process 600 can begin when LLRs for a code block are ready to be loaded into system 300. At block 602, load engine 310 can determine the number of active rows 314 in de-interleaving buffer 312 for the new code block. For instance, the number of active rows can be determined based on the interleaving width (e.g., modulation order) used at the transmitter. At block 604, load engine 310 can load LLRs from LLR source 302 column-wise into one of the de-interleaving buffers (e.g., de-interleaving buffer 312-0). De-interleaving buffer 312-0 need not be (and generally is not) large enough to hold all the LLRs for the code block. Accordingly, once load engine 310 has filled de-interleaving buffer 312, load engine 310 can enter a "Buffer Done" state at block 606. In some embodiments, load engine 310 can remain in the "Buffer Done" state until DRM engine 320 signals that it has finished reading the LLRs from the other de-interleaving buffer (e.g., de-interleaving buffer 312-1). At block 610, if more LLRs remain to be loaded for the current code block, then at block 612, a buffer swap can be executed. The buffer swap can include any process that results in load engine 310 being enabled to write to a different de-interleaving buffer from the one that was just written (e.g., enable writing to buffer 312-1 if buffer 312-0 was just written) and DRM engine 320 being enabled to read from the de-interleaving buffer that was just written (e.g., enable reading from buffer 312-0 if buffer 312-0 was just written). The buffer swap can be executed when load engine 310 and DRM engine 320 have both finished operating on their respective current buffers. Process 600 can then return to block 604 to load the next buffer. Process 600 can continue in this manner until all LLRs for the code block have been loaded from LLR source 302. At block 612, after all LLRs for the code block have been loaded, load engine 310 can continue other operations. For instance, load engine 310 can execute process 600 again to load another code block.

FIG. 7 shows a flow diagram of a process 700 that can be implemented in a DRM engine (e.g., DRM engine 320) according to some embodiments. In some embodiments, process 700 can be implemented by configuring DRM controller 420. Process 700 can begin when a de-interleaving buffer (e.g., de-interleaving buffer 312-1) is available for reading, which can occur, for instance, after LLRs have been loaded into de-interleaving buffer 312-1 by load engine 310 executing process 600. At block 702, DRM engine 320 can select a row of the de-interleaving buffer to read. In some embodiments, rows can be selected sequentially. At block 704, DRM engine 320 can determine a target address (or target location) in NCB buffers 340 for the selected row. For example, the determination can be based on the rate-matching pattern for the code block, which defines which LLR positions in the rate-matched sequence correspond to which bits of the transmitted code block. Given a mapping of bit positions in the code block to addresses in NCB buffers 340, the target address can be readily determined based on the LLRs' position in the rate-matched sequence. In some embodiments, the target address can include multiple addresses.

At block 706, DRM engine 320 can determine whether an address collision condition exists between the target address for the selected row and recently targeted addresses. For example, DRM controller 420 can maintain a list of the target addresses for the L most recently read rows of de-interleaving buffer 312-$i$, where L can be equal to (or larger than) the read-after-write latency of NCB buffers 340. In some embodiments, L can be equal to the number of entries in cache 406. Where cache 406 is operated as a FIFO, the list of cache entries can identify recently targeted NCB buffer addresses. DRM controller 420 can compare the target address determined at block 704 to the recent target addresses and detect an address collision condition if there is an address match. Depending on implementation, the target address for a given operation can include multiple addresses (e.g., a range of addresses), and an address match can include instances where some or all of the target addresses coincide. If an address collision condition is detected, then at block 708, DRM controller 420 can select cache 406 as the source for existing LLRs to be combined with the new LLRs. If an address collision condition is not detected, then at block 710, DRM controller 420 can select NCB buffers 340 as the source for the existing LLRs. In either case, DRM controller 420 can generate a read request (to cache 406 or NCB buffers 340 as the case may be) with appropriate timing such that the existing LLRs are ready to be added to the new LLRs when the new LLRs arrive at adder circuit 436, allowing for memory latency. Thus, for instance, a read request to retrieve existing LLRs from NCB buffers 340 for a particular group of new LLRs can be sent before the new LLRs are read from de-interleaving buffer 312. Further, using the rate-matching pattern, DRM engine 320 can predict address collisions in advance and can issue (or refrain from issuing) read requests to NCB buffers 340 accordingly.

At block 712, the new LLRs can be read from the selected row of the de-interleaving buffer. For example, DRM controller 420 can generate a row selection signal to row selector circuit 402, which transfers the selected row from its input to its output. At block 714, the new LLRs and existing LLRs can be added to generate updated LLRs. For example DRM controller 420 can trigger operations of shift circuit 432, register 434, adder unit 436, and saturation unit 438. The output of saturation unit 438 can be the updated LLRs. At block 716, the updated LLRs can be written to cache 406. For instance, DRM controller 420 can send a cache write signal with the target address (as determined at block 704) to be associated with the updated LLRs provided from saturation unit 438. At block 718, the updated LLRs can be written to NCB buffers 340. For instance, cache 406 can be a write-through cache that passes the data through to NCB buffers 340; DRM controller 420 can provide a memory write request to NCB buffers 340 with the target address (as determined at block 704).

At block 720, DRM engine 320 can determine whether all active rows in the de-interleaving buffer have been read. If not, then process 700 can return to block 702 to read the next row. Once all rows in the de-interleaving buffer have been read, at block 724, DRM engine 320 can determine whether all LLRs for the code block have been read. If not, then at block 726, DRM engine 320 can execute a buffer swap with load engine 310. As described above with reference to FIG. 6, the buffer swap can include any process that results in DRM engine 320 being enabled to read from a different de-interleaving buffer than the one that was just read. In some embodiments, the buffer swap can include DRM engine entering a "Buffer Done" state and waiting until load engine 310 also enters the "Buffer Done" state. Other synchronization mechanisms can be used. Once the next de-interleaving buffer is ready for reading, process 700 can return to block 702 to read rows of the next de-interleaving buffer. If, at block 724, all rows for the code block have been read, then at block 730, DRM engine 320 can continue other operations. In various embodiments, such other operations can include signaling to a decoder engine that the code block is now ready for decoding and/or proceeding to execute process 700 again for another code block.

The de-interleaving and rate recovery systems and processes described above are illustrative and can be modified. In some embodiments, the decision logic in DRM controller 420 can select cache 406 rather than NCB buffers 340 as a source for existing LLRs in any instance where LLRs for the target address are in cache 406, regardless of whether an address collision exists. This approach can reduce traffic to NCB buffers 340, although the reduction might be insignificant depending on the rate matching pattern. If multiple entries associated with the same target address are present in cache 406, the most recent entry can be read back at block 708.

In some embodiments, de-interleaving and rate recovery can incorporate additional capabilities. For example, some communication systems incorporate hybrid automatic repeat request (HARQ) or other techniques in which a code block can be retransmitted if the receiver requests retransmission or fails to acknowledge receipt. In some embodiments, when a code block is retransmitted, LLRs from the previous transmission can be pre-loaded into code block buffer 340 prior to adding any LLRs from the new code block. After pre-loading, load engine 310 and DRM engine 320 can operate in the manner described above, thereby combining the retransmitted code block with the previous code block. Where a previous transmission is not available, the code block buffer can be cleared during an initialization stage. As another example, load engine 310 can perform operations such as descrambling on the LLRs received from the LLR source prior to writing to de-interleaving buffers 312.

Data synchronization between load engine 310 and DRM engine 320 can be implemented such that DRM engine 320 does not read a particular LLR or LLR group from de-interleaving buffer 312 until that LLR or LLR group is ready for reading and so that load engine 310 does not overwrite a particular LLR or LLR group in de-interleaving buffer 312 until after DRM engine 320 has read that LLR or LLR group. A variety of techniques can be used, including signaling "Buffer Done" states between the two engines as described above. Similarly, data synchronization between DRM engine 320, which updates a code block in a particular code block buffer 342, and a downstream engine that consumes code blocks (e.g., a decoder engine such as an LDPC decoder engine for 5G shared channel) can be implemented such that DRM engine 320 has exclusive access to a particular code block buffer 342 until de-rate-matching for the code block is complete, at which time DRM engine 320 can release the completed code block buffer 342 to a downstream consumer and begin to prepare a new code block in a different code block buffer 342. In some embodiments, de-interleaving and rate recovery system 300 or similar systems can be incorporated into a decoding pipeline for 5G PDSCH as described in above-referenced U.S. application Ser. No. 17/448,867, which provides data synchronization via a hardware-based interlock controller and firmware based flow control to manage configurable aspects of operation such as the rate-matching pattern. De-interleaving and rate recovery systems of the kind described herein can be implemented in a variety of receiver devices using a variety of data synchronization techniques and supporting a variety of network standards including but not limited to 5G.

While specific embodiments have been described, those skilled in the art will appreciate that variations and modifications are possible. For instance, in embodiments described above, all updated LLRs are written to both cache and NCB buffers. If desired, DRM controller 420 can include predictive logic to determine whether an address for which an LLR is being updated will have an address collision with an LLR in a subsequent row and can selectively cache updated LLRs in anticipation of address collisions. (It will be appreciated that predictive logic can involve more complexity than simply caching every updated LLR.) Similarly, in embodiments described above, all updated LLRs are written back to the NCB buffers, and a second write to the same address may be initiated before data is read back from the first write (e.g., based on an updated LLR computed using the cache). While it is unnecessary to cancel outstanding write requests that are superseded by subsequent write requests, cancellation logic may be implemented if desired. Caches and buffers are not limited to any particular size or architecture, and any degree of parallelism of operations can be supported. Further, while the foregoing description makes reference to LLRs as the elements of a code block, it should be understood that the same principles can apply to other data elements that can be combined across different instances of a received code block.

In some embodiments, circuits and/or techniques of the kind described herein can be implemented in decoding pipelines for PDSCH (or PUSCH) data, e.g., for 5G radio access networks. However, embodiments are not limited to any particular application, and similar joint de-interleaving and rate recovery circuits can be used in any processor or other device for decoding data that was encoded using a process where rate matching precedes interleaving.

All processes described herein are illustrative and can be modified. Operations can be performed in a different order from that described, to the extent that logic permits; operations described above may be omitted or combined; and operations not expressly described above may be added.

Unless expressly indicated, the drawings are schematic in nature and not to scale. All numerical values presented herein are illustrative and not limiting. Reference to specific standards for cellular data communication (e.g., 4G LTE or 5G NR) are also for purposes of illustration; those skilled in the art with access to the present disclosure will be able to adapt the devices and methods described herein for compatibility with other standards.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise" or "can arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must). The word "can" is used herein in the same permissive sense (i.e., having the potential to, being able to).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set {w, x, y, z}, these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set {w, x, y, z}, thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, Applicant will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A circuit comprising:
   a combiner unit configured to receive a plurality of new data elements for a subset of positions in a code block and a plurality of existing data elements for the subset of positions in the code block and configured to compute a plurality of updated data elements for the subset of positions in the code block;
   a cache coupled to the combiner unit and configured to receive and store the plurality of updated data elements;
   a code block buffer coupled to the combiner unit and configured to store a set of data elements for the code block at a plurality of locations such that different locations in the plurality of locations correspond to different positions in the code block, the code block buffer being further configured to receive and store the plurality of updated data elements in the locations corresponding to the subset of positions in the code block;
   a selection circuit configured to receive a plurality of first input data elements from the cache and configured to receive a plurality of second input data elements from the code block buffer and to selectably provide either the first input data elements or the second input data elements as the existing data elements to the combiner unit; and
   a controller unit coupled to the combiner unit, the cache, and the code block buffer, wherein the controller unit is configured to:
      determine, based on a rate-matching pattern associated with the code block, a target location in the code block buffer for the plurality of new data elements;
      detect an address collision condition with respect to the target location; and control the cache, the code block buffer, and the selection circuit such that when the address collision condition is detected, the cache provides a cached plurality of updated data elements associated with the target location to the selection circuit and the selection circuit provides the first input data elements as the existing data elements to the combiner unit.

2. The circuit of claim 1 wherein the controller unit is further configured such that when the address collision condition is not detected, the code block buffer provides the stored data elements from the target location to the selection circuit and the selection circuit provides the second input data elements as the existing data elements to the combiner unit.

3. The circuit of claim 1 wherein the cache is configured to store the plurality of updated data elements in association with the address of the target location.

4. The circuit of claim 1 wherein the controller unit is further configured to generate a write request to the code block buffer to write the plurality of updated data elements to the code block buffer, the write request including an address of the target location in the code block buffer.

5. The circuit of claim 4 wherein the controller unit is further configured to detect the address collision condition when the target location overlaps with a previous target location from a previous write request to the code block buffer, wherein the previous write request was issued fewer than a threshold number of cycles previously.

6. The circuit of claim 5 wherein the threshold number of cycles is determined based on a read-after-write latency of the code block buffer.

7. The circuit of claim 1 further comprising:
a de-interleaving buffer configured to store a plurality of data elements in an array having a plurality of rows and a plurality of columns, wherein the de-interleaving buffer has a storage capacity smaller than a size of the code block, and wherein data elements are written to the de-interleaving buffer in column-wise order; and
a row selector circuit configured to provide a plurality of data elements from a selected one of the rows of the de-interleaving buffer to the combiner unit as the new data elements.

8. The circuit of claim 1 wherein the cache includes a number of entries sufficient to cover a read-after-write latency of the code block buffer.

9. A cellular modem processor comprising:
a decoder pipeline, the decoder pipeline including a de-interleaving and rate recovery engine and a plurality of code block buffers, wherein the de-interleaving and rate recovery engine includes:
a combiner unit configured to receive a plurality of new data elements for a subset of positions in a code block and a plurality of existing data elements for the subset of positions in the code block and configured to compute a plurality of updated data elements for the subset of positions in the code block;
a cache coupled to the combiner unit and configured to receive and store the plurality of updated data elements;
a code block buffer coupled to the combiner unit and configured to store a set of data elements for the code block at a plurality of locations such that different locations in the plurality of locations correspond to different positions in the code block, the code block buffer being further configured to receive and store the plurality of updated data elements in the locations corresponding to the subset of positions in the code block;
a selection circuit configured to receive a plurality of first input data elements from the cache and configured to receive a plurality of second input data elements from the code block buffer and configured to selectably provide either the first input data elements or the second input data elements as the existing data elements to the combiner unit; and
a controller unit coupled to the combiner unit, the cache, and the code block buffer, wherein the controller unit is configured to:
determine, based on a rate-matching pattern associated with the code block, a target location in the code block buffer for the plurality of new data elements;
detect an address collision condition with respect to the target location; and
control the cache, the code block buffer, and the selection circuit such that when the address collision condition is detected, the cache provides a cached plurality of updated data elements associated with the target location to the selection circuit and the selection circuit provides the first input data elements as the existing data elements to the combiner unit.

10. The cellular modem processor of claim 9 wherein the decoder pipeline further includes:
one or more de-interleaving buffers configured to store a plurality of data elements in an array having a plurality of rows and a plurality of columns, wherein the de-interleaving buffers have a storage capacity smaller than a maximum size for the code block; and
a load engine coupled to the de-interleaving buffers and configured to load data elements from a data element source into one of the de-interleaving buffer in a column-wise order.

11. The cellular modem processor of claim 10 wherein the de-interleaving and rate recovery engine further includes:
a row selector circuit configured to provide a plurality of data elements from a selected one of the rows of the de-interleaving buffer to the combiner unit as the new data elements.

12. The cellular modem processor of claim 11 wherein the decoder pipeline includes at least two de-interleaving buffers and wherein the decoder pipeline is configured such that the load engine loads data elements into a first one of the de-interleaving buffers while the row selector circuit reads from a second one of the de-interleaving buffers.

13. The cellular modem processor of claim 9 wherein the controller unit is further configured such that when the address collision condition is not detected, the code block buffer provides the stored data elements from the target location to the selection circuit and the selection circuit provides the second input data elements as the existing data elements to the combiner unit.

14. The cellular modem processor of claim 9 wherein the controller unit is further configured to generate a write request to the code block buffer to write the plurality of updated data elements to the code block buffer, the write request including an address of the target location in the code block buffer.

15. The cellular modem processor of claim 9 wherein the cache is a write-through cache that provides the updated data elements for writing to the code block buffer at the target location.

16. The cellular modem processor of claim 9 wherein the decoder pipeline is configured to decode a physical downlink shared channel (PDSCH) for a 5G radio access network.

17. A method comprising:
- reading, by a selection circuit of a processing engine, a plurality of new data elements for a code block from a row of a de-interleaving buffer having an array of rows and columns to store data elements;
- determining, by a controller of the processing engine, a target address in a code block buffer for the new data elements based on a rate-matching pattern established for the code block;
- determining, by the controller, based on the target address, whether an address collision condition exists;
- when the address collision condition exists, selecting, by the controller a cache entry corresponding to the target address as a source location for a plurality of existing data elements;
- when the address collision condition does not exist, selecting, by the controller, a code block buffer as the source location for the plurality of existing data elements, wherein the plurality of existing data elements is read from the code block buffer using the target address;
- computing, by a combiner circuit of the processing engine, a plurality of updated data elements based on the new data elements and the existing data elements selected by the controller; and
- writing, by the processing engine, the updated data elements to the cache and to the code block buffer using the target address.

18. The method of claim 17 further comprising:
- writing, by a load engine, a plurality of data elements to the de-interleaving buffer,
- wherein the load engine writes the plurality of data elements to the de-interleaving buffer in a column-wise order, and
- wherein reading the plurality of new data elements by the selection circuit commences after writing of the plurality of data elements by the load engine has completed.

19. The method of claim 18 wherein writing the data elements to the de-interleaving buffer includes determining a number of active rows based on a configuration parameter associated with the code block, wherein the load engine writes the data elements only to the active rows.

20. The method of claim 17 wherein determining whether the address collision condition exists includes determining whether the target address overlaps with a previous target address from a previous write request to the code block buffer, wherein the previous write request was issued fewer than a threshold number of cycles previously.

* * * * *